United States Patent [19]
Grörich

[11] 3,973,781
[45] Aug. 10, 1976

[54] SELF-LUBRICATING SEAL

[75] Inventor: Kurt Grörich, Berlin-Weissensee, Germany

[73] Assignee: VEB Gummikombinat Berlin, Berlin-Weissensee, Germany

[22] Filed: May 21, 1973

[21] Appl. No.: 361,995

[30] Foreign Application Priority Data
May 23, 1972 Germany.............................. 163142

[52] U.S. Cl............................... 277/134; 277/96.1; 277/153; 308/36.1; 308/240
[51] Int. Cl.²..................... F16C 33/72; F16J 15/44; F16J 15/54; F16C 31/00
[58] Field of Search................ 277/134, 96 A, 96 R, 277/153; 308/36.1, 240

[56] References Cited
UNITED STATES PATENTS

| | | | |
|---|---|---|---|
| 1,882,956 | 10/1932 | Sandler................................ | 308/240 |
| 3,497,225 | 2/1970 | Workman........................... | 277/134 |
| 3,620,540 | 11/1971 | Jagger et al........................ | 277/134 |
| 3,785,660 | 1/1974 | Bush.................................... | 277/134 |
| 3,801,113 | 4/1974 | Jackson .............................. | 277/134 |

FOREIGN PATENTS OR APPLICATIONS 499,480   1/1937   United Kingdom................. 277/134

Primary Examiner—Robert J. Spar
Assistant Examiner—Howard Beltran
Attorney, Agent, or Firm—Karl F. Ross; Herbert Dubno

[57] ABSTRACT

A seal or packing engages a rotary machine part, e.g. a shaft, to be sealed off. Lubricant is drawn into the extended sealing area between the seal and the machine part and retained therebetween as a packing fluid, when the machine part rotates, regardless of the direction of rotation. Two or more sealing rings in tandem can be used as a self-lubricating packing ring or slide bearing.

5 Claims, 20 Drawing Figures

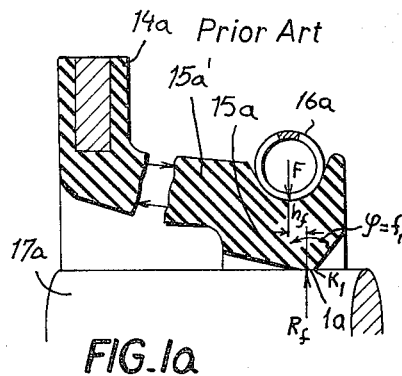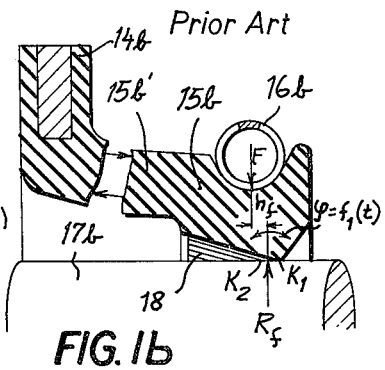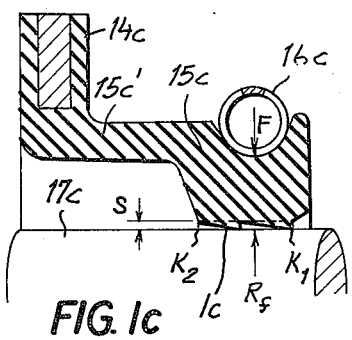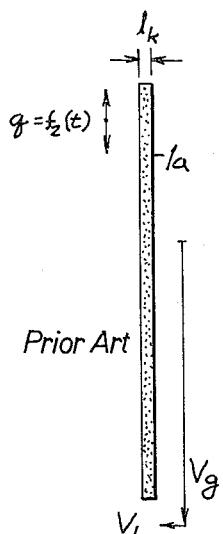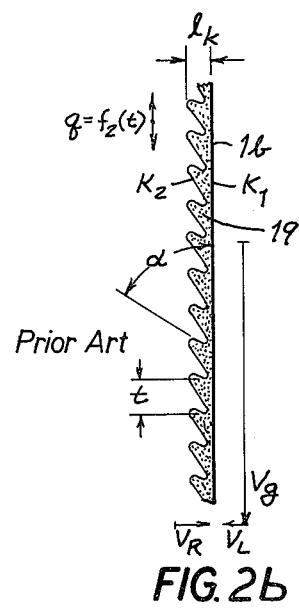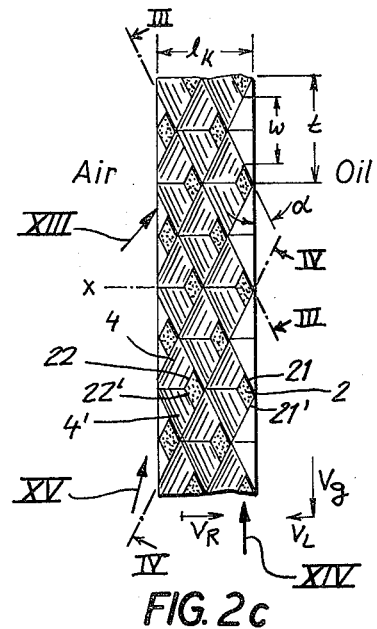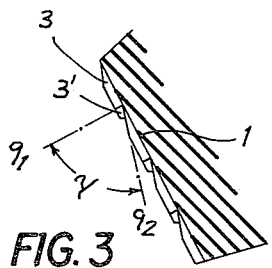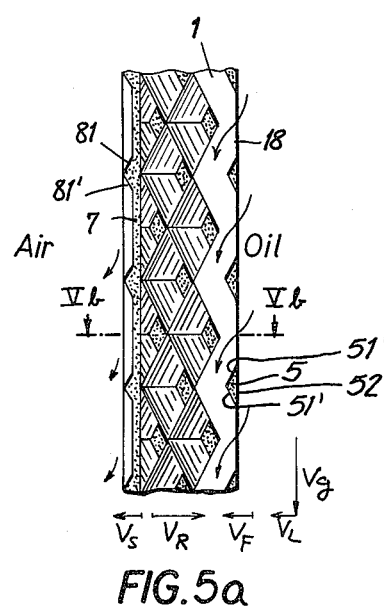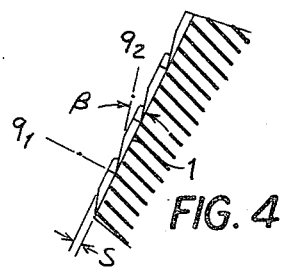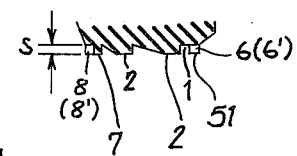

SELF-LUBRICATING SEAL

FIELD OF THE INVENTION

My invention relates to a hydrodynamic bearing, seal or packing and, more particularly, to packing and bearing rings for sealing rotary machine parts, e.g. shafts. The invention thus relates to devices in which a hydrodynamic pressure field is built up between the relatively sliding parts.

BACKGROUND OF THE INVENTION

Conventional radial packing rings for rotary motion have a packing lip of substantially truncated-cone configuration and composed of a structurally strong rubber material or a synthetic elastomer. The contact area between the packing lip and the rotary machine part to be sealed off or packed is very short so that its sharp edge presses against the machine part with the radial pressure inherent in the packing lip and/or that of a tension spring washer surrounding the packing lip in a circular groove thereof.

The packing effect results from the mutual pressure exerted by the rubber or elastomer surface and the surface of the machine part. There is only a small flexible engagement between the surfaces, and because of the roughness of the surfaces there is a minute clearance therebetween. A lubricant can leak through this clearance because of capillary forces, thereby limiting friction between the surfaces. Where one or both of the surfaces have a high degree of roughness, this clearance may be excessive so that the lubricant will then not be retained between the surfaces but may leak past the packing seal or bearing in prohibitive amounts. The interfacial forces operating between the surfaces and the surface tension of the lubricant must then be sufficiently strong to prevent such leakage.

The friction between the surfaces is a combination of solid friction, boundary-layer friction and liquid friction, all of which vary depending upon the lubrication conditions, the rotary speed and the degree to which the surfaces have been worn away by mutual contact during the rotary motion. Thus, the overall friction can vary substantially. Prior-art radial shaft-packing rings are characterized by a high overall friction, a narrow-contact surface and prohibitive leakage where mutual pressure is raised to limit leakage friction and wear increases.

It has proved to be difficult to lower the friction coefficient with conventional packing rings. The recommended maximum peripheral velocity of a standard ring may be, say 10 m/s. If this speed is exceeded, frictional heat may damage the packing ring. However, by making the packing ring of high-quality special rubber it has proved possible to increase the peripheral velocity to 25-30 m/s without causing material damage to the packing ring although the rotary machine part can be worn and ridged. A hardened surface of the rotary machine part cannot completely prevent such abrasion and wear and the sharp edge of the packing lip gradually cuts a groove in the rotary machine part surface. This causes clearance problems between the packing lip and the rotary machine part, requiring machining of the latter upon packing replacement.

Hydrodynamic packings use a gap which can be made fluid tight by means of formations on one or both of the relatively rotating members which induce a feed back of fluid to generate a hydrodynamic field which seals off the lubricant. Thus, the lubricant acts as its own barrier to leakage.

However, this sealing effect is only possible with some systems when the direction of rotation is opposite to the direction of the pitch of the back-feed formation and the packing must have an elongated cylindrical contact surface of approximately 5 mm and a helical formation of about two turns. Because the back-feed effect occurs only in one direction of rotation the use of such packing rings is naturally restricted. To overcome, this problem, packing rings have been developed of alternating twist so that the hydrodynamic action can be achieved in both directions of rotation. Capillary grease traps are arranged along the front edge of the conical packing surface. They are formed as flat isosceles triangles. Their acute angles point in the direction of the periphery and their legs are formed as sharp helical edges. The triangular areas can protrude from the packing surface with their apices adjacent the front edge of the packing ring. There can also be a small gap between the front edge of the packing ring and the circular line of triangular areas, the bases of the triangles rather than their apices now being adjacent the front edge. The effect of these two arrangements is that the helical edges always have the same pitch in relation to the lubricant body contacting the front edge of the packing ring, regardless of the direction of rotation of the shaft, and a back-feed effect results in either rotational sense. However, despite the presence of a hydrodynamic packing effect due to a back-feed helix configuration, the packing ring and also the shaft are subjected to considerable solid friction in addition to liquid and boundary friction, although the proportion of liquid friction now is substantially higher. Abrasion and wear can be noticeable. Further, the back-feed helix arrangement becomes inefficient as the abrasion of the contact surface of the packing ring continues, and the service life is severely limited.

OBJECTS OF THE INVENTION

The principal object of my invention is to provide an improved packing, bearing bearing or sealing arrangement which is free from the above-mentioned disadvantages, is inexpensive, has low friction, is of high hydrodynamic efficiency, offers low wear and is effective with rotation in opposite senses.

Another object of my invention is to provide a shaft-packing ring of long service life.

Still another object of my invention is to provide a slide bearing of long service life.

SUMMARY OF THE INVENTION

The aforementioned objects are attained in accordance with my invention by designing the contact surface of the sealing or packing ring surrounding the rotary machine part, e.g. a shaft, to be sealed off in such a way that enough lubricant will be drawn into the contact or sliding area between the seal ring and the rotary machine part and retained therebetween as a packing fluid. Such a contact surface is characterized by a multiplicity of lubrication gaps leading to a multiplicity of sliding surfaces. The lubrication gaps are disposed along helical lines. A hydrodynamic effect will result so that a supporting lubricating film is formed which separates the sealing ring surface from the surface of the rotary machine part. Fluid friction will dominate and solid friction will be substantially eliminated, regardless of the direction of rotation of the machine part.

The sealing ring for sealing a rotary machine part has an annular contact surface surrounding the rotary machine part, a seal edge and an opposite parallel edge, e.g. an air edge. The contact surface has an array of facets formed by a multiplicity of oblique frustopyramids. Each frustopyramid has a rhombic base. The long diagonal of the rhombic base is parallel to the seal edge. Each frustopyramid has also a smaller geometrically similar rhombic top surface for contact with the rotary machine part. The frustopyramids are arranged side by side symmetrically with respect to an axial plane through the short diagonal of one of the rhombic surfaces. The rhombic top surface is so located in relation to the respective rhombic base that an edge of each frustopyramid which faces the seal edge is substantially normal to the contact surface and to the surface of the rotary machine part to be contacted. The opposite edge of the frustopyramid forms a wedge-shaped gap with the surface of the rotary machine part.

The assembly comprises a pair of relatively slidable members having juxtaposed surfaces, one of the surfaces being substantially smooth. The other surface is formed with an array of closely spaced geometrically similar frustopyramids converging toward the first surface, the frustopyramids each having a small rhombic base turned toward the first surface and diagonals parallel to the corresponding diagonals of the small rhombic bases of the other frustopyramids. Each frustopyramid has a first edge perpendicular to its small base and a diagonally opposite second edge including an obtuse angle with its small base whereby the edges lie in a common plane perpendicular to the plane of the respective small base and intersecting same along its small diagonal, the first and second edges of all said frustopyramids being turned toward opposite sides of the second surface.

Thus, I provide a multiplicity of small rhombic sliding surfaces on frustopyramids, equally spaced over the inner periphery of the packing ring or lip, staggered in several stages, and pointing with their acute angles in the peripheral direction. The frustopyramids project as reliefs with a small offset over the cylindrical contact surface. They are spaced over a contact surface which is at least ten times longer than the contact surface of the frustoconical packing lips of the prior art which have back-feed helix ribs or grooves or capillary grease traps. The sides of the frustopyramids facing the seal edge of the contact surface are upright and have sharp helical edges while the sides facing the opposite edge of the contact surface have tapered surfaces with acute or extremely acute angles.

The ratio between the total area of all rhombic top surfaces and the area of the whole contact surface as projected against the rotary machine part to be sealed is up to one tenth. The remainder of the contact surface defines the clearances formed between the same and the rotary machine part which serves as a lubricant-containing space between the packing lip and the rotary machine part. The formation of narrow lubricating wedges facilitates the overall build-up of a supporting lubricating film. The rhombic facet structure of the contact surface is also symmetrical with respect to the peripheral direction so that its packing effect does not depend on the direction of rotation.

During rotation of the rotary machine part a drag flow in the peripheral direction is caused by the adhesive forces of the lubricant. A fluid ring is formed in front of the packing lip. It has a small axial pressure component, the leakage pressure, so it attempts to twist its way through the packing gap between the packing ring and the rotary machine part surface. However, all sharp helical edges of the frustopyramids of my invention which have a pitch which is substantially opposite to the direction of rotation face this drag flow and the leakage pressure and exert a back-feed effect on the lubricant in a well-known manner and literally pump it back to the area of the rotary machine part to be sealed off. The sharp helical edges of the frustopyramids with a pitch in the direction of rotation are in a turbulent region and remain ineffective as a pump of the lubricant. However, when the direction of rotation is reversed, the function of the sharp helical edges are also reversed. The rhombic facet structure of the contact surface of the packing lip functions as a miniature pump with a multi-stage cascade effect as is the case in axial flow machines which always pump in the direction of the area to be sealed off, regardless of the direction of rotation. Viewed from the other side of the contact surface, the air side, this cascade functions like an axial-flow compressor producing a stagnation pressure against the area to be sealed off, which pressure counteracts leakage to the air side.

With very high rotational or sliding velocities, the pumping effect may become so strong that the fluid lubricant will be entirely displaced from the contact surface. This would result in lubrication entirely by air which involves an extremely low friction. However, normally, the spacing between the rhombic top surfaces in the peripheral direction should be such that perfect packing is not attained by the first line of frustopyramids adjacent the seal of the contact surface. Substantial amounts of lubricant should be allowed to leak to the following lines of frustopyramids, and flow over the sloping surface of the frustopyramids, the acute-wedge surfaces, by the drag flow in the peripheral direction, thereby causing the well-known hydrodynamic lubrication effect.

To ensure feeding sufficient amounts of lubricant to the sliding area, also when lubricants of higher viscosity are used, the facet structure of my invention may be arranged with one or more lines of sliding bodies, which are integral with the packing lip and located along the seal edge of the contact surface. Each sliding body has a top surface in the form of an isosceles triangle defined by dividing the rhombic top surface of one of the frustopyramids along its long diagonal. The base of each such isosceles triangle lies along the seal edge, and the sliding bodies are three-sided prisms with flat sides and with the same height as the frustopyramids. When the rotary machine part is rotated, the helical edges adjacent to the drag flow, with a pitch in the direction of rotation, pump the lubricant into a sliding area between the line of sliding bodies and the area of the frustopyramids, until an equilibrium state is brought about due to the back-feeding action of the sharp helical edges of the frustopyramids. The result will be a compressed packing fluid ring contained within the contact area. This ring lubricates the contact surface with fluid friction. The packing effect is ensured provided the number of pumping stages, i.e. lines or stages of frustopyramids, with back-feed action, are greater than the number of stages of sliding bodies which feed lubricant to the sliding area of the contact surface.

The facet structure of my invention generally is not provided with an uninterrupted continuous packing edge along its circular periphery. When the rotary machine part is not rotating, static packing will result in the gap between the contact surface of the packing ring and the rotary machine part due to interfacial forces and surface tension of lubricant accumulated in the gap. However, with a thin-fluid lubricant of low surface tension, it is possible that lubricant leaks through the gap or clearance during a rest period, especially if the rotary machine part is vertically disposed and the seal edge of the contacting surface is located above the seal edge and the pressure caused thereby will be conducive to leakage. To overcome this problem, I also contemplate a ring-shaped packing ring which is integral with the packing lip and disposed in a direction parallel with the air edge of the contacting surface. The width of the packing rib is less than the short diagonal of the rhombic top surface of the frustopyramids in the facet structure, the flat walls of the packing rib are substantially normal to the contact surface of the packing lip and the height of the packing rib is the same as any of the frustopyramids. It is preferred for the packing rib to be very narrow because it contributes to solid friction.

The entry of dirt into the packing clearance between the packing ring and the rotary machine part can result in rapid wear and short service life. I can overcome this problem by providing a line of sliding bodies along the air edge of the contacting surface, the edge opposite to the seal edge of the contacting surface. These sliding bodies are integral with the packing lip and has a top surface geometrically similar to the rhombic top surface of a frustopyramid in the facet structure. They are prisms with flat sides normal to the contact surface and with the same height as the frustopyramids. When the rotary machine part is rotated, a hydrodynamic dust-rejecting action will result, regardless of the direction of rotation of the rotary machine part. One packing ring of the prior art has a special dust protective lip, such a lip causes substantial friction. Also, the manufacture of such a packing ring requires more complicated tools.

My sealing ring can be used as a radially effective packing as well as an axially acting packing ring. When it is used as a radially acting packing ring, the contact surface with facet structure forms a cylindrical shell in which the rotary machine part rotates. When it is used as an axially acting packing ring, its contact surface forms a ring against which a flange-like or ring-like portion of the rotary machine part will slide.

My sealing ring can also be developed as a component in a maintenance-free slide bearing for radial as well as axial guidance of the rotary machine part.

According to a particularly advantageous feature of my invention, my sealing ring can be used as a one-piece packing ring without a packing ring casing. Such a packing ring consists of a simple massive profile ring and resembles somewhat an O-ring. An O-ring is received in a slot in the machine casing in which a shaft, for instance, is journaled. It can be made with a small cross-section, to pack machine parts not in motion but also to pack machine parts in reciprocating motion, e.g. in hydraulic machinery, and to a limited extent, to pack rotary machine parts. A manufacturer of O-rings states that the O-ring has proved good for limited service in rotary motion "up to maximum pressures of 85.32 lbs. per sq. in. gauge and maximum peripheral velocities of 1 m per sec." My sealing ring can be used as an O-ring with great advantage. A long contact or sliding surface is very desirable for O-ring purposes, and my sealing ring can be provided with thin-walled packing ribs along both edges of the contact surface to prevent leakage in non-motion. The cross-section of the ring, which should have a thin wall, can have a waist-band portion with its ends slightly tapered in a direction outwardly from the axis of the ring.

The inner surface of the waist-band portion of the ring is provided with a contact surface with the facet structure according to my invention for packing in motion, preferably with two or more lines of sliding bodies to ensure static packing and hydrodynamic rejection of dust as explained in the foregoing. The tapered end portions of the ring are provided with packing surfaces to ensure leak-proof conditions in non-motion. This packing ring is mounted in an accommodating cylindrical slot in a machine casing like an O-ring is mounted. It is supported with its outer narrow cylindrical packing surfaces on the bottom of the slot while the withdrawn central cylindrical portion of the packing ring is spaced from the bottom by a fraction of a millimeter. The inner diameter of the packing ring is smaller than the diameter of the shaft to be mounted and sealed off by a fraction of a millimeter to provide a pressure between the packing ring and the shaft. When the shaft is mounted on the packing ring or the packing ring is mounted on the shaft, the central cylindrical portion of the packing ring is expanded while the outwardly tapered ends of the packing ring function as rubber push-springs and provide an additional pressure on the shaft to ensure sufficient contact between the contact surface of the packing ring and the shaft. This one-piece packing ring for radial packing having a facet structure according to my invention, can be used for higher pressures than the O-ring because of its flexible engagement in the accommodating slot and for much higher peripheral velocities because of its low friction. It is also possible to use two or more packing rings of my invention arranged in tandem in an accommodating slot when a very large hydrodynamic pressure field is desirable.

It is easy to modify this radially acting massive one-piece packing ring as an axially packing ring, a thin-walled packing washer extending in a radial direction. An axially acting packing ring has the rhombic facet structure of the contact surface for packing in motion contacting a shaft ring or other flanged portion of the shaft on one of its plane faces while the narrow concentric packing surfaces for packing in non-motion in the ring-shaped accommodating slot contact the concentrically disposed walls of this slot.

Thus, my sealing ring will, when it is engaged in an accommodating slot as explained in the foregoing, have a guiding function. It can be designed as a self-lubricating and self-packing radially acting slide bearing sleeve or as an axially acting slide bearing washer. Synthetic elastomers with exceptional resistance qualities, such as polytetrafluoroethylene or polyurethane, are suitable materials for the sleeves and the washers of my invention.

For a radial slide bearing, two equal sleeves are required, designed in the same way as the radial one-piece packing ring but with greater width, with more pumping stages to yield the necessary bearing force. The two sleeves are mounted in a slot or groove in the bearing housing so that the sharp helical edges of the sliding surface of both sleeves are directed to the interior of the bearing, and consequently, pump lubricant in this direction when the shaft mounted in the bearing housing rotates. The groove is somewhat larger than the total width of the two sleeves which are arranged to float in the groove on a film of lubricant during rotation of the shaft. A narrow ring-shaped clearance is formed between the sleeves. During rotation of the shaft, the flexible slide bearing sleeves are pumping against each other and are thereby generating a hydrodynamic pressure field in the axial direction with an increase of pressure at each pumping stage so that a high static pressure in the ring-shaped clearance between the two sleeves is prevailing. With the static pressure increasing from stage to stage, the lubricant is pressed in the peripheral direction between the successive stages of pumping helical edges into the wedge-shaped lubricant gaps and onto the rhombic top surfaces of the frustopyramids. The two fields superimpose one another and provide the bearing force of the slide bearing. The flexible bearing sleeves always pump towards the interior of the bearing, so that the single lubricant feed remains as a sealing fluid ring in the sliding area and substantially no losses of lubricant occur. Sealing against dust and static sealing when the shaft is not rotating can be achieved by providing lines of sliding bodies on the contact surface having the structure of my invention and continuous packing ribs as disclosed hereinbefore.

I also contemplate as a feature of my invention an axial slide bearing, functioning as a step bearing for the axial guidance of a shaft. Such an axial slide bearing can, in analogy with the radial slide bearing composed of two radially acting one-piece packing rings, be developed from the axially acting one-piece packing ring. A guiding function and a fixed bearing effect can be achieved by mounting two axially acting bearing sleeves in a shaft casing so they will contact the opposite sides of a sliding element mounted on the shaft with their facet structure surfaces, respectively. Such function and effect can, of course, also be achieved by combining one or more radially acting packing rings with one or more axially acting packing rings.

By means of the rhombic facet structure of the sliding surface of a sealing or packing ring for rotary motion, a sliding fit with fluid friction can be attained in which a hydrostatic as well as hydrodynamic directional pressure field is established simultaneously within the sliding area by the viscous shearing forces in such a way that the sliding fit or surface always pumps in one direction, regardless of the direction of rotation. Stable fluid or liquid friction conditions can easily be attained with my sealing rings and solid friction amounting to less than one tenth of the mixed or combined friction can easily be attained. As to fluid friction, the friction coefficient is almost exclusively determined by the viscosity of the lubricant. Fluid friction can be calculated by applying the hydrodynamic lubrication theory. Fluid friction means a sliding motion with practically no wear. Stringent requirements as to material characteristics, to be met when mixed friction with considerable solid friction is prevailing, can be substantially relaxed by using the sealing or packing rings of my invention. The sliding surface of a shaft, for instance, does not need to be subjected to a special hardening treatment to withstand the frictional conditions encountered during rotation.

When my sealing ring is used as a packing ring for rotary machine parts, the following advantages can be noted as far as friction performance, service life and packing effects are concerned:

Standard rubber can be used to manufacture the packing rings, even when high peripheral velocities are contemplated. This means a considerable saving because high-quality special rubber products are very expensive and often difficult to treat.

Another valuable advantage of my contact surface with facet structure is the ability to store lubricant in the clearance between the contact surface and the rotary machine part by the wetting of the boundary surfaces, which ability provides instantaneous lubrication when the rotary machine part is re-started after a long time of non-motion. This substantially inhibits the adhesion phenomena often observed in practice after long dwell times. Adhesion phenomena constitute severe problems with conventional tapered packing lips. Locally high surface compression between the contact surface and the rotary machine part due to the sharp front edge of the packing lip causes the rubber surface to increasingly penetrate into the minute roughness pattern relief of the sliding surface of the rotary machine part, and lubricant present therebetween is gradually squeezed out. This may result in the above-mentioned phenomena, especially in case the rubber is somewhat sticky. Deposition of hardened rubber, formed by abrasion of the packing lip, and carbonized lubricant can be observed along the narrow contact surface after long periods of running. There must then be a breaking off from this adhesive condition when the rotation of the shaft is started again. In addition, increased friction and wear will result and the packing ring will deteriorate and fail in a short while.

Another advantage of my sealing ring is the improved serviceability, operational safety and reliability of machines and instruments when they are provided with the sealing ring around rotary machine parts. A user is understandably annoyed when packing rings and washers in machines and instruments fail. The cost of repairs, to replace the failing elements, is higher than the price thereof.

Flexible slide bearing elements made in accordance with my invention and disclosed in the foregoing are characterized by maintenance-free and extremely quiet running due to the division of the contact or sliding surface into a multiplicity of small contact surface elements. This is particularly true with high velocity slide bearings which can replace ball bearings and do so at a surprisingly small cost of materials in a number of applications.

DESCRIPTION OF THE DRAWING

I will now describe various embodiments of my invention in connection with the accompanying drawing in which:

FIGS. 1a – 1c are cross-sectional elevational views of three different packing lips, FIG. 1a representing a conventional packing lip with smooth tapered surface and sharp front packing edge, FIG. 1b representing a packing lip with helical ribs on the tapered surfaces, and FIG. 1c the sealing or packing lip according to my invention;

FIG. 2a is a developed view of the lip of the prior-art seal of FIG. 1a;

FIG. 2b is a developed view of the prior-art seal of FIG. 1b;

FIG. 2c is a developed view of the contact surface of the seal according to my invention and corresponding to FIG. 1c;

FIGS. 3 and 4 are sections along lines III—III and IV—IV, respectively, of FIG. 2c;

FIG. 5a is a developed view of the contact surface of a seal according to one embodiment of my invention;

FIG. 5b is a section along line Vb — Vb of FIG. 5a;

SPECIFIC DESCRIPTION

Figure 6:
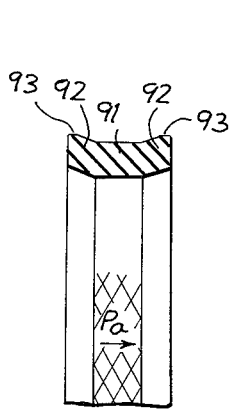
FIG. 6 is a sectional view, partly in diagrammatic form, of a springless one-piece packing ring according to my invention.

The cross-sectional views of FIGS. 1a – 1c show the operating position of a packing lip 15a, 15b, 15c on a shaft 17a, 17b, 17c. FIG. 1a and FIG. 1b show packing lips 15a, 15b of prior-art types.

The radial force $R_f$ is caused by making the inner diameter of the packing lip 15a, 15b at the sharp front edge $K_1$ slightly smaller than the diameter of the shaft 17a, 17b, by bending apart the conical shell-shaped connecting bridge 15a', 15b' to the casing flange 14, and by the circumferential force of the tension spring ring 16a, 16b. The packing lip 15a, 15b and the shaft 17a, 17b are pressed together by this radial force.

In the case of the line contact of the smooth tapered packing surface shown in FIG. 1a and FIG. 2a, a narrow cylindrical projected contact surface 1a having a length $l_K$ will be formed on the edge $K_1$ by flattening the edge.

The packing lip 15b shown in FIG. 1b has on its tapered packing surface a back feed helix consisting of helical ribs 18, the pitch of which is opposite to the sliding direction of the shaft, which has a peripheral velocity $v_g$. The helical ribs 18 end at the front edge $K_1$ and have the same height and the same spacing $t$ in a peripheral direction. However, the sharp front edge $K_1$ is pressed against the shaft by the radial force $R_f$ caused by the tight fit of the packing lib 15b around the shaft 17b, by the bending apart of the connecting bridge 15b', and by the circumferential force of the tension spring ring 16b, so that the contact surface 1b between the packing lip 15b and the shaft 17b is a continuous strip with the bulbs 19 protruding therefrom with an angle of $\alpha$, the pitch of the helical ribs 18.

A closed continuous ring is formed at the front edge $K_1$ by adjusting any of the following parameters: the height of the ribs 18, which can be as great as 0.2 mm, the helix angle $\alpha$ of the helical ribs 18, and of course the radial force $R_f$ and the elastic deformability of the lip material. Leakage of lubricant can be prevented when the contact ring is closed, also in non-motion, i.e. the static state.

The result of the flattening of the helical ribs 18 is illustrated in FIG. 2b, showing the extent of the intimate contact between the packing lip 15b and the shaft 17b. Rib portions 18 behind the closed ring or contact surface provide hydrodynamic packing during rotation of the shaft 17b. However, the pressure is not equally distributed behind the closed ring 1b but pressure peaks occur at the helical ribs 18, caused by high local pressure, which favors an undesirable solid friction between the packing lip 15b and the shaft 17b. The helical ribs 18 are therefore soon worn down and the distribution of pressure behind the closed ring 1b will then be more uniform. However, this development is conducive to loss of the hydrodynamic packing effect and ultimate leakage.

The rigid suspension of the flexible tapered packing lip 15a, 15b and the conical shell-shaped connecting bridge 15a', 15b', on the rigid casing flange 14a, 14b and also the spring-loaded support of the packing front edge $K_1$ on the shaft 17a, 17b, where the plane of action of the spring force F with the spring lever arm $h_F$ is outside the support region $K_1$, $K_2$, contribute to make the flexible part of the lip an oscillation system characterized by longitudinal vibration $q = f_2(t)$ in the peripheral direction as well as pitching vibration $\phi = f_1(t)$ of the packing lip around ($t$) packing edge. Longitudinal vibration seems to be due to solid friction. More recent studies of friction have shown that solid contact causes adhesion of short duration by the formation and destruction of friction bridges on the roughness peaks of the sliding surface, which results in an intermittent sliding (stick-slip effect) and thus excites friction oscillations. With bad lubricating conditions on the packing lip, these friction oscillations will often produce unpleasant whistling noises.

The pitching oscillations of the packing lip are excited by shaft oscillations or concentricity errors of the shaft. This oscillating behavior is influenced by the length, the thickness and the conical shell angle of the connecting bridge to the casting flange which therefore must be dimensioned rigid enough to keep the amplitude small and to avoid lateral tilting of the packing lip. On the other hand, should be considered that good radial movability is desirable for the packing lip, to make it capable of following the movement of the shaft, so that a compromise as to the length, the thickness and the inclination of the conical shell of the connecting bridge must be made. A rubber product for the packing ring with excellent elasticity and strength characteristics and low self-damping is required to provide efficient packing.

The above-mentioned problems are avoided with the design of my packing lip, as shown in FIGS. 1c, 2c, 3, 4 etc. The radial force $R_f$ is applied differently, and the pressure distribution along the contact surface and the oscillating behavior of the packing lip are different from the prior art. The undesirable phenomena which seriously interfere with the performance of known packing lips during a long period of running are suppressed, and specific requirements for material selection are eliminated.

My packing lip 15c has a length $l_K$ between edges $K_1$ and $K_2$, which is greater than the diameter of the tension spring ring 16. The spring force F operates approximately in the center of contact surface 1c between the edges $K_1$ and $K_2$ and the shaft 17c supports the packing lip 15c along all its contact surface 1c by the radial force $R_f$. It is practical to make the diameter of the contact surface 1c equal to the diameter of the shaft 17c and to design a pressing tool accordingly. The packing lip 15c shrinks slightly after vulcanization, if it is made of rubber, so that there will be a slight tensile stress in the lip material when the lip is mounted on the shaft and is in operation.

The stable support of the packing lip 15c prevents pitching oscillation and the connecting bridge 15c' to the rigid casing flange 14c does not support the packing lip 15c further. Thus, the thickness of the bridge 15c' is not critical as in the prior-art packing lips. The only function of the connecting bridge 15c' in my packing lip design is to join the packing lip 15c and the casing 14c and to form a tight wall. The connecting bridge 15c' should be an extremely thin cylindrical tubular part, which interferes little with the radial transverse mobility of the packing ring 15c engaging the shaft 17c, due to excentricity and other concentricity errors of the lip and the shaft. The radial force $R_f$ will then almost exclusively be generated by the tension spring ring 16c and by the tension of the packing lip 15c itself. Oscillations of the packing lip will therefore be substantially eliminated, and special material requirements regarding elasticity and self-damping do not have to be considered. The only material properties to be considered are the swelling resistance and the softness. The spring force is transferred to the shaft 17c as the pressing force of the packing lip 15c as completely as possible.

The gist of my invention resides in the design of the contact surface of the packing lip 15c. This design allows the aforementioned advantages of my packing lip. FIG. 2c shows the contact surface 1 rolled out or developed on the drawing plane, below the packing lip profile. The small rhombic facets are staggered in four stages regularly and symmetrically with respect to an axial plane through the line x. Each single facet is a flat, oblique frustopyramid with a height s and a flat sliding surface 2 which is the rhombic top surface of a frustopyramid.

The facets are oblique to the oil or sealing medium side in such a way that the front side surfaces 3 and 3', shown in the section along III — III in FIG. 3, are approximately normal to the sliding surfaces 2 with which they form the sharp helical surfaces 21 and 21' with the helix angle $\alpha$. The flat surfaces 4 and 4' of the facets which face the air side or opposite side to the oil side have an acute angle $\beta$ with respect to the surface of the shaft to be sealed off, as illustrated by the section along II — II in FIG. 4. They form together with the sliding surface 2 the surfaces 22 and 22'. The total area of the sliding surfaces 2 is only about one tenth of the area of the contact surface of the packing ring which can be called the projected contact surface. The dividing space t between the facets is a fraction of $d\pi$, where d is the diameter of the shaft or the inner diameter of the packing ring when mounted on the shaft. The dividing space t is about three times longer than that of the helical ribs of the frustoconical packing lip shown in FIG. 1b. The space 2 between the sliding surfaces also in the peripheral direction, is also comparatively large, which allows lubricant to easily penetrate into the sliding area.

All sliding surfaces 2 are on a cylindrical surface so that the pressure exerted on them is substantially equally distributed, when the packing lip 15 is mounted and the shaft 17 is rotated. This equal distribution of pressure favors the forming of an effective supporting lubricant film, as is particularly readily seen in FIGS. 3 and 4, wherein the straight line $g_1$ is normal to the projected contact surface 1 and the straight line $g_2$ intersects line $g_1$, at the contact surface 1 with the angle y. The pitch of these two lines determine the pumping efficiency and the hydrodynamic fluid drag of the lubricant up over the surfaces 4 and 4' and ultimately onto the sliding surfaces 2 (FIG. 2c).

When a shaft 17c rotates in a packing ring 15c of my invention, the running is very smooth and monotonous. The packing lip 15c "swims" on the shaft 17c after a supporting lubricating film has been generated. The lubricant adheres to the shaft surface by capillary forces acting in the clearance between the contact surface and the shaft surface. This causes a drag flow in the peripheral direction, which drag flow is superimposed by an axial flow of the lubricant with a low velocity component. Hence, the lubricant "twists" through the clearance with a very small angle. The penetration of lubricant depends on the width of the clearance. The relation between sliding velocity $v_g$ and leakage velocity $v_L$ in the contact surface 1 is shown in FIG. 2c. The lubricant must circle the shaft 17 many times before it has twisted the clearance entirely because of the comparatively great width $l_K$ of the contact surface 1 of my packing lip 15. It repeatedly strikes the helical surfaces 21 during this passage, which results in a back-feeding effect $v_R$. The surfaces 21 sharply counteract the $v_L$ component and are drawn as a thick line. Thus, the rhombic facets, arranged in four staggered stages and oblique to the area to be sealed off, constitute a multiple obstacle of labyrinth which prevents leakage of lubricant very efficiently.

FIGS. 5a and 5b show another embodiment of my invention, a part of the contact surface 1 having three staggered stages of sharp helical surfaces with a back-feed effect $v_R$. This contact surface has on its oil side a line of sliding bodies r in the form of isosceles triangles. Their base 52 is adjacent the oil area and the lateral sides 51 and 51' point to the air side. The sliding surfaces 5 are the top surfaces of flat three-sided prisms with widest clearance s as their height. The side surfaces 51 and 51' form sharp helical surfaces. When the shaft rotates as indicated by the sliding velocity $v_g$, the helical edges 51 are inclined with respect to the direction of relative flow of the lubricant with a small angle $\alpha$. The lubricant is fed to the sliding area by the feeding velocity $v_p$, in addition to the natural leakage velocity $v_L$. However, the three-stage helical surfaces lattice is counteracting these effects with its back feed velocity $v_R$ and leakage cannot occur.

In the embodiment of the contact surface of my packing ring shown in FIGS. 5a and 5b, in the form of a continuous solid packing surface or rib 7 which is integral with the packing lip and located on the air side of the contact surface or on the side opposite to the sealing medium side. The sliding surfaces 81, 81' can form a part of such a packing surface. Such sliding surfaces provide a dust-rejecting effect.

Thus, a sliding surface or contact surface fully developed in accordance with my invention meets all requirements for a sealing surface in motion. It is characterized by excellent packing capability, extremely low friction, efficient static packing in non-motion and efficient dust insulation. Lubricant is retained within the sliding area to form a liquid packing ring. The contact surface also prevents leakage.

Figure 7:
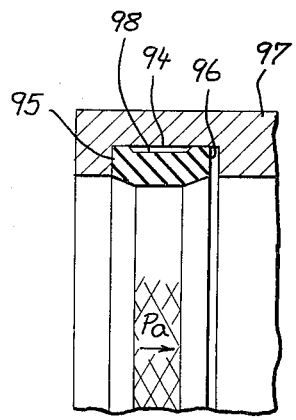
FIG. 7 is an axial section through a machine casing provided with the packing ring of FIG. 6.

In FIGS. 6 and 7, a one-piece compact packing ring 9 is shown having a cylindrical waist band 91 and narrow tapered cylindrical ends 92. The inner cylindrical surface 91 of the waist band has a sliding surface corresponding to FIG. 2c. The pumping effect of this surface when a shaft (not shown) is rotated in the packing ring 9 is indicated by arrow $p_a$. The cylindrical ends 92 have exterior packing surfaces 93. The packing ring 9 is accommodated in groove or slot 94 of a machine casing 97. There is a clearance 98 between the outer surface of the waist band portion of the packing ring 9 and the flat bottom of the groove 94 to ensure a flexible assembly of the packing ring 9 in the groove 94. When the packing ring pumps in the direction $p_a$ it is pressed against the side surface 95 of the groove by a reaction force, and a ring-shaped clearance 96 between the packing ring and the opposite side surface of the groove results in which a static pressure prevails. Lubricant in the clearance 96 provides the necessary lubricant film between the sliding surface of the packing ring 9 and the shaft surface. If there was no lubricant clearance with static pressure, the sliding surface would run "dry".

Figure 8:
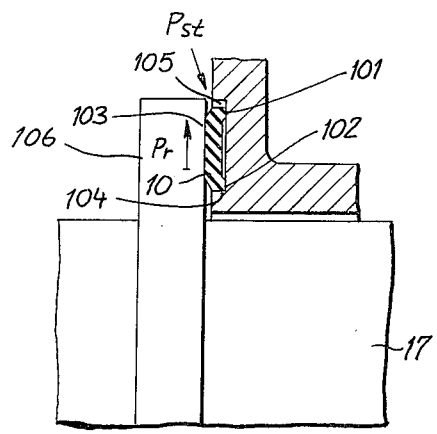
FIG. 8 is a semi-sectional view of an axial packing ring according to my invention.
Figure 10:
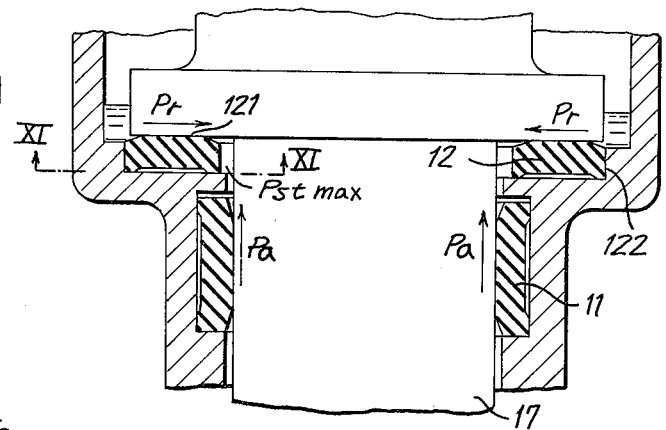
FIG. 10 is an axial cross-sectional view of a combined radial slide and axial slide bearing assembly according to my invention.

The axially acting packing ring 10 illustrated in FIG. 8 in assembled state has the same cross-section as the radially acting ring of FIG. 6 but is disk-shaped rather than cylindrical. Packing surfaces for sealing in a static condition are provided on the concentric surfaces 101, 102. The ring-shaped surface 103 which slides against the shaft ring 106 has a sliding surface pattern as described in connection with FIG. 2c for packing in motion. The pattern is the same as is shown in FIG. 10. The sharp helical edges point outwards so that it pumps and seals off in this direction.

Figure 9:
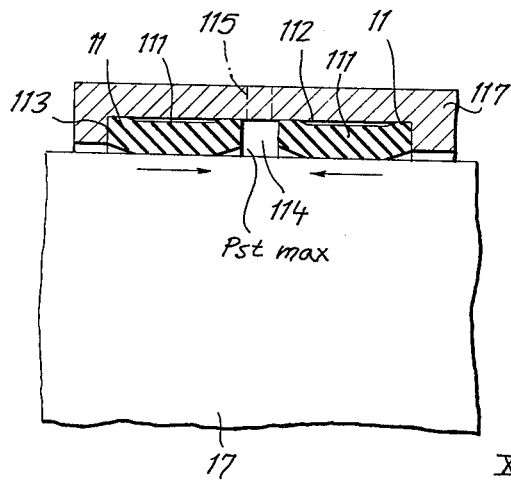
FIG. 9 is a semi-sectional view of a radial slide bearing according to my invention.

FIG. 9 shows a radial slide bearing. The bearing sleeves or bushes 11 are constructed in the same manner as the radial acting packing ring 9 of FIG. 6. The thin cylindrical central part 111 is extended for the bearing function. Its cylindrical inner surface has a sliding surface pattern according to FIG. 2c or FIGS. 5a and 5b but with a larger number of stages of helical edges, which always pump in the direction $p_a$, regardless of the direction of rotation. The identical sleeves 11 which pump in opposite directions are mounted in the ring chamber 112 of the bearing casing 117 with almost perfect engagement leaving only a small cylindrical bearing tolerance. There is also an annular clearance established between the two bearing sleeves 11, in which clearance a high static pressure $p_{st\ max}$ arises when the bearing is operated. The bearing sleeves are pressed against the side surfaces 113 of the ring chamber 111 by this static pressure and the pump effect $p_a$ itself. An access hole 115 for lubricant feed provides means for adjusting the static pressure $p_{st\ max}$.

Figure 11:
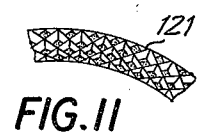
FIG. 11 is a view of the thrust bearing of the latter taken along line XI—XI of FIG. 10.

FIGS. 10 and 11 show a combination of a radial packing ring 11 and an axial packing ring 12 to constitute the combined radial and axial slide bearing. The bearing sleeve 11 with its pumping effect $p_a$ is counteracted by the axial bearing disc 12 with its pumping effect $p_r$ produced by the sliding surface pattern 121 which is impressed on the radial plane of the projecting central part of the disc. The lubricant is thereby pumped from the lubricant supply or sump to the bearing sleeve 11 until a balanced condition is reached. The helical edges of the sleeve 11 will also make it function as a packing ring. A static pressure $p_{st\ max}$ arises in the annular clearance between the two slide bearing elements.

The axial slide bearing disc 12 corresponds to the axial packing ring 10 of FIG. 8 in its construction except that the central part of the disc with the surface pattern of my invention is wider and provided with more pumping stages to function properly as a bearing element.

Annular faces of disc-shaped packing rings and slide bearing discs can be provided with sliding or contact surfaces in a step-wise manner. Outer areas of the sliding surface on a ring or disc are provided with more frustopyramids per 360° (or circumferential unit length) than the middle and the inner areas of the sliding surface, and thus, an effort is made to provide the sliding surface with frustopyramids of the same size as far this is practical. Two or more stages or ring sections of frustopyramids with a narrow clearance therebetween can be provided to attain optimal pumping and-/or bearing effect. FIG. 10 shows two such ring sections of frustopyramids.

Figure 12:
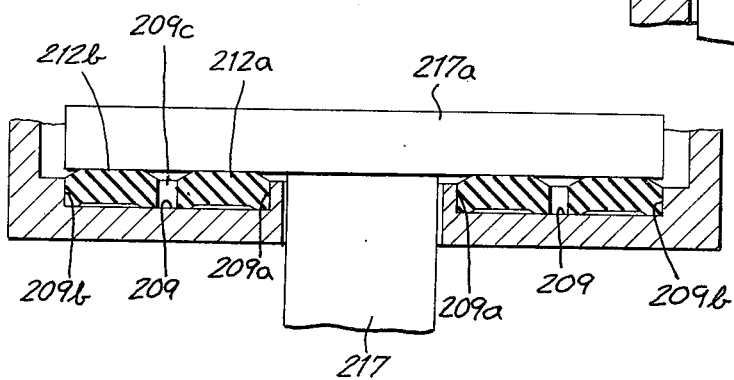
FIG. 12 is an axial section through a thrust-bearing assembly according to another embodiment of the invention.
Figure 13:
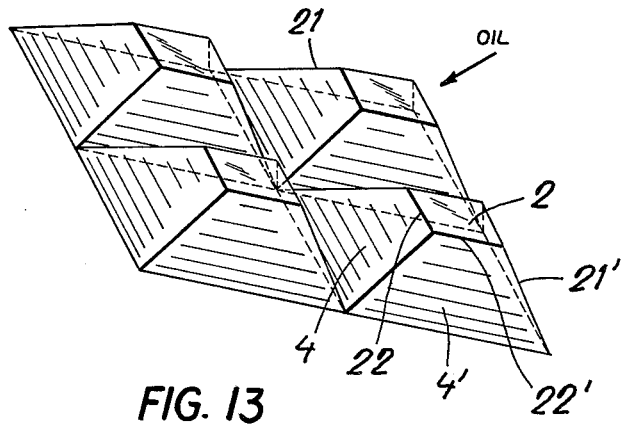
FIGS. 13–15 are respectively, a detail view in perspective taken in the direction of arrow XIII, an elevational view in the direction of arrow XIV and an elevational view in the direction of arrow XV of FIG. 2c.
Figure 14:
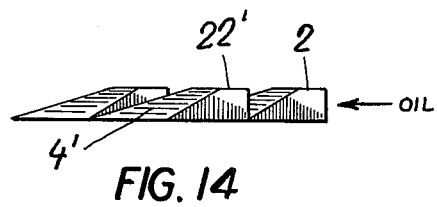
Figure 15:
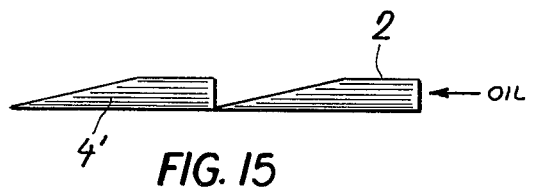

Finally I contemplate the use of an axial slide bearing assembly without any radial slide bearing element (FIG. 12). Such a slide bearing can be assembled by using two concentric axially acting slide bearing discs 212a, 212b. The inner bearing disc 212a with its sharp helical edges pointing outwards is seated on the inner shoulder 209a of an annular groove 209, while the outer bearing disc 212b with its sharp helical edges pointing inwards engages the outer shoulder 209b of the groove so that an annular clearance 209c is established between the two bearing discs 212a, 212b. The discs pump lubricant against one another and retain thereby a liquid sealing ring within the sliding area which has its static maximum pressure in the central annular clearance.

I claim:

1. An assembly comprising a pair of relatively slidable members having juxtaposed surfaces, one of said surfaces being substantially smooth and the other of said surfaces being formed with an array of closely spaced geometrically similar projecting frustopyramids converging toward said one of said surfaces, said frustopyramids each having a relatively large rhombis base proximal to said other surface and a relatively small rhombic base geometrically similar to the respective large rhombic base and turned toward said one of said surfaces and diagonals parallel to the corresponding diagonals of the small rhombic bases of the other frustopyramids, each frustopyramid having a first edge perpendicular to its small base and a diagonally opposite second edge including an obtuse angle with its small base whereby said edges lie in a common plane perpendicular to the plane of the respective small base and intersecting same along its small diagonal, the first and second edges of all said frustopyramids being turned toward opposite sides of said other of said surfaces, said projecting frustopyramids lying at least two rows with the frustopyramids of the two rows being mutually staggered.

2. A ring for hydrodynamically sealing a rotary machine part, comprising an annular lip having an annular contact surface surrounding the axis of said part and juxtaposed with a surface of said part, said lip having a seal edge and another edge, said contact surface having with an array of facets formed by a multiplicity of oblique projecting frustopyramids, each said frustopyramid having a rhombic base with its long diagonal parallel to said edges and its short diagonal perpendicular thereto, and a smaller geometrically similar rhombic top surface for contact with said part, said frustopyramids being arranged side by side symmetrically with respect to an axial plane through the short diagonal of one of said rhombic surfaces, said rhombic surface of each frustopyramid being so located in relation to the respective rhombic base that an edge of each frustopyramid is substantially normal to the respective top surface and to the surface of said part, the opposite edge of the frustopyramid forming a wedge-shaped gap with said surface of said part, said projecting frustopyramids lying in at least two rows with the frustopyramids of the two rows being mutually staggered.

3. The ring defined in claim 2, further comprising a line of sliding bodies integral with said lip and spaced therearound, said sliding bodies having top surfaces in the form of isosceles triangles defined by dividing said rhombic top surface along its long diagonal, the base of each such isosceles triangle lying along said seal edge, and said sliding bodies being three-sided prisms with flat sides and with the same height as said facets.

4. The ring defined in claim 2, further comprising a line of sliding bodies integral with said lip along said other edge, each of said sliding bodies having a top surface geometrically similar to said rhombic top surface, and said sliding bodies being prisms with flat sides normal to said contact surface and with the same height as said facets.

5. The ring defined in claim 2, further comprising a ring-shaped packing rib integral with said lip, parallel with said air edge, the width of said packing rib being less than the short diagonal of said rhombic top surface, the flat walls of said packing rib being substantially normal to said contact surface, and the height being the same as that of said frustopyramids.

* * * * *